Aug. 7, 1951 A. C. BARNEBL 2,563,205
AUTOMATIC FILTER VALVE
Filed Sept. 13, 1948

INVENTOR.
AUGUST C. BARNEBL
BY

Patented Aug. 7, 1951

2,563,205

UNITED STATES PATENT OFFICE 2,563,205

AUTOMATIC FILTER VALVE

August C. Barnebl, Chicago, Ill., assignor to Oliver United Filters Incorporated, Oakland, Calif., a corporation of Nevada Application September 13, 1948, Serial No. 49,007

5 Claims. (Cl. 251—90)

This invention relates in general to continuous rotary filters such as exemplified in the Oliver Patent No. 919,628 of April 27, 1909, the Salisbury Patent No. 1,259,139 of March 12, 1918, and the Oliver Patent No. 1,335,695 of March 30, 1920.

More particularly, this invention relates to an automatic filter valve used in conjunction with filters of the types disclosed in the patents above referred to, and which serve to control their cycle of operation. (The complete cycle of operation of such filters may include a pick-up cycle, a washing cycle, a drying cycle, and a discharge cycle.)

Continuous rotary filters include a plurality of independent, contiguous filter units, compartments or sections arranged in the form of a rotary drum, rotary disc, or rotary table, and which are made to travel through a body of the pulp or slurry which is to be filtered. The cycle of operation of these filters may include a cake pick-up cycle, a washing cycle, a drying cycle and a cake discharge cycle. During the cake pick-up cycle, it is frequently desired to separate the initial or cloudy filtrate from the subsequent and clear filtrate, and also to separate these filtrates from the wash water which may thereafter be applied to the cake for the purpose of removing chemicals therefrom. Although in exceptional cases it is possible to remove the cake deposited on the filter medium while it is still under the influence of a vacuum, in most cases it is essential to discharge the cake either under the influence of a neutral pressure or under the influence of a blow-back or reverse pressure. To enable these various operations to take place, each of the filter units or sections is connected to a rotary valve member. This valve member rotates in sealing engagement with a fixed valve body provided interiorly with a number of ports arranged to communicate with one or more vacuum receivers, with atmospheric pressure or with a source of super-atmospheric pressure. The number of ports in the valve body obviously depends upon the desired cycle of operation of the filter.

To date, automatic filter valves have been designed for a particular cycle of operation, although by the use of so-called bridges, the time during which each filter section communicates with any given port of the valve, may be controlled within limits by adjusting their position.

In general, the object; of this invention is the provision of an automatic filter valve wherein the stationary valve body is provided with an interior annular channel communicating with the exterior of the valve body through a plurality of threaded ports and wherein by the simple expedient of threading one or more nipples into these ports the annular channel within the valve body can be divided into as many compartments as is desired so as to permit any selected cycle of operation. The outer end of these nipples can either be sealed or connected to vacuum receivers, atmosphere, or a source of super-atmospheric pressure.

The invention possesses other advantageous features, some of which, with the foregoing, will be set forth at length in the following description where that form of the invention which has been selected for illustration in the drawings accompanying and forming a part of the present specification is outlined in full. In said drawings, one form of the invention is shown, but it is to be understood that it is not limited to such form, since the invention as set forth in the claims may be embodied in a plurality of forms.

Referring to the drawings.

Figure 1:
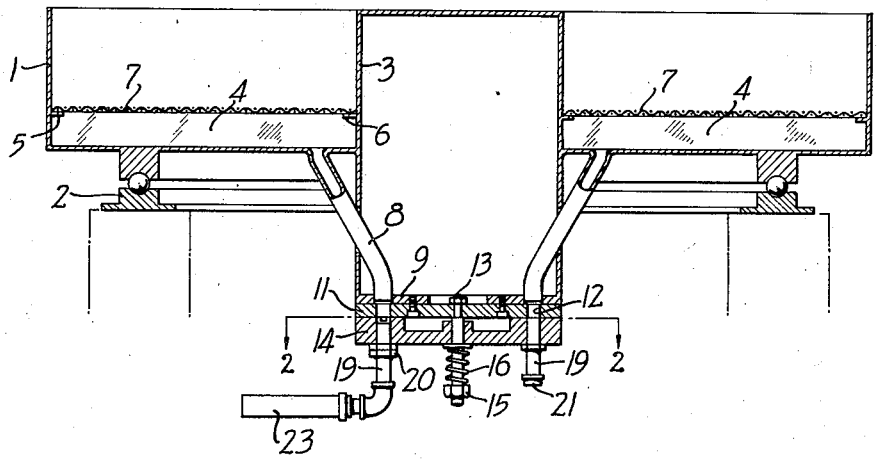
Fig. 1 is a vertical mid-section taken through a rotary filter table of the type disclosed in the Oliver Patent No. 1,335,695, and which is associated with an automatic filter valve embodying the objects of my invention.

The filter shown in Fig. 1 includes an annular pan 1 mounted for rotation on an annular track 2. The interior wall of the pan 1 consists of a concentric depending pipe 3 and the pan is divided into a plurality of sector-shaped compartments by division strips 4. Mounted on inwardly extending flanges 5 and 6 formed on the side walls of the pan 1 is a filter medium 7, which although not shown in the drawings can be supported on a suitable drainage screen of conventional construction in accordance with standard practice.

Each of the filtrate compartments defined by any two adjacent division strips 4 communicates through a suitable pipe 8 with a pipe plate 9. Bolted to the pipe plate 9 is a wear plate 11 provided with a circle of spaced holes 12, there being one such hole in communication with each of the filtrate pipes 8. If, therefore, the pan 1 is divided by the division strips 4 into eighteen filtrate compartments, there will be eighteen filtrate pipes 8 and eighteen holes 12 corresponding thereto and, of course, rotating with the pipe 3 and the pan 1. The structure so far described is well known to the trade and therefore needs no further explanation.

Mounted concentrically on the wear plate 11 is a bolt 13 and carried by the bolt 13 is a valve body 14. Operating between the outer face of the valve body 14 and a nut 15 threaded to the lower end of the bolt 13, is a coil spring 16 serving to hold the valve body in sealing engagement with the wear plate 11.

Figure 2:
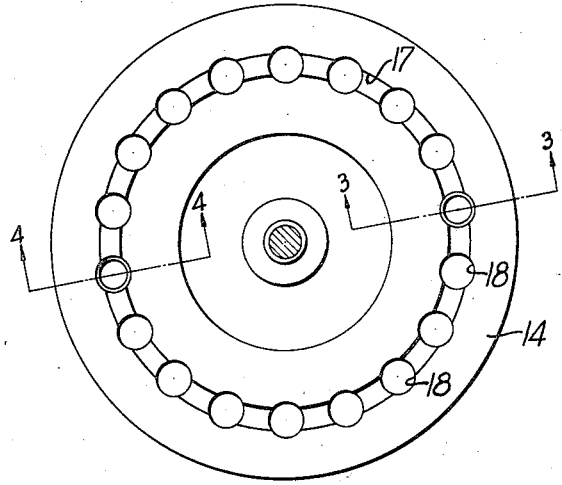
Fig. 2 is a section taken on the line 2—2 of Fig. 1.

As best shown in Fig. 2, the valve body 14 is formed on its inner face with an annular channel 17 arranged to underlie the holes 12 and to communicate therewith. Extending through the valve body 14 from its outer face to its inner face are a plurality of threaded ports 18 intercepting the channel 17 and of a diameter somewhat larger than the width of the channel 17. The circle on which the holes 18 are formed is of course concentric with the pipe 3 and preferably the holes 18 are equally spaced about this circle and in number should correspond with the number of filtrate compartments into which the pan 1 is divided.

Figure 3:
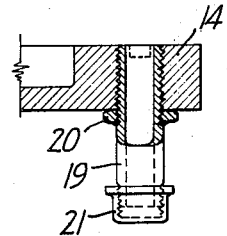
Fig. 3 is a section taken on the section line 3—3 of Fig. 2.

Threaded into selected members of the group of holes 18 are nipples 19 to which are welded nuts 20 serving as shoulders for locating the upper ends of the nipples flush with the inner surface of the valve body 14 as shown in Fig. 3. When the nipples 19 are used in this fashion their lower ends are sealed with a threaded cap 21 and simply serve to completely block off the channel 17 at selected points depending upon the cycle of operation desired.

Figure 4:
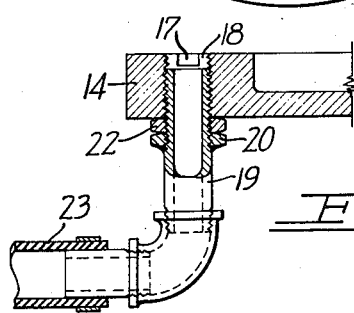
Fig. 4 is a section taken on the section line 4—4 of Fig. 2.

For the purpose of connecting a desired portion of the channel 17 with a source of vacuum or pressure, to a common manifold or to any other point in the system a space nut 22 (see Fig. 4) is threaded on one of the nipples 19 above the nut 20 welded thereto and then the nipple is threaded into the selected hole 18 until the nut 22 abuts the lower face of the valve body 14. The lower end of this nipple can then be connected through a conduit 23 with any point desired.

From the above description it will be seen that I have provided an automatic filter valve which can be readily adjusted externally to provide any cycle of operation desired without the necessity of disconnecting the valve.

I claim:

1. An automatic valve comprising: a valve member arranged to rotate on a fixed axis and provided with a plurality of spaced holes extending therethrough and arranged in a circle concentric to said axis; and a non-rotatable valve body mounted on said valve member in sealing engagement therewith, said valve body being provided on its inner face with a channel concentric to said axis and in registration with said holes, and with a plurality of threaded ports extending through said valve body and its channel, said ports being arranged to receive nipples for intercepting said channel.

2. An automatic valve comprising: a valve member arranged to rotate on a fixed axis and provided with a plurality of holes extending therethrough and arranged on a circle concentric with said axis; a non-rotatable valve body mounted on said valve member in sealing engagement therewith, said valve body being provided on its inner face with a channel concentric to said axis and communicating with said holes, and also with a plurality of threaded ports extending through said valve body and its said channel; and a nipple threaded into one of said ports with its inner end flush with the inner surface of said valve body so as completely to obstruct said channel, the lower end of said nipple being arranged to be sealed or to be placed in communication with a source of subatmospheric pressure.

3. In combination a sectionalized rotary filter; a valve disc arranged to rotate with said filter on a fixed axis, said disc being provided with a plurality of holes extending therethrough, arranged on a circle concentric with said axis and communicating respectively with the sections of said filter; a non-rotatable valve body mounted on said valve disc in sealing engagement therewith, said valve body being provided on its inner face with an annular channel concentric to said axis and communicating with the inner ends of said holes, and also with a plurality of threaded ports extending through said valve body and intersecting its said channel; and nipples threaded into selected member of said plurality of ports with their inner ends flush with the inner surface of said valve body and forming a continuation thereof.

4. An automatic valve comprising: a valve member arranged to rotate on a fixed axis and provided with a plurality of spaced holes extending therethrough and arranged on a circle concentric with said axis; and a non-rotatable valve body mounted on said valve member in sealing engagement therewith, said valve body being provided on its inner face with a channel concentric with said axis and in registration with said holes, and with a plurality of threaded ports extending through said valve body and its channel; and a nipple threaded into at least one of said holes, said nipple being provided intermediate its ends with a shoulder so located that when it is in abutment with the lower face of said valve body, the upper end of said nipple will be flush with the upper face of said valve body.

5. An automatic valve comprising: a valve member arranged to rotate on a fixed axis and provided with a plurality of spaced holes extending therethrough and arranged on a circle concentric with said axis; and a non-rotatable valve body mounted on said valve member in sealing engagement therewith, said valve body being provided on its inner face with a channel concentric to said axis and in registration with said holes, and with a plurality of threaded ports extending through said valve body and its channel; and a nipple threaded into at least one of said holes, said nipple being provided intermediate its ends with a shoulder so located that when it is in abutment with the lower face of said valve body, the upper end of said nipple will be flush with the upper face of said valve body, and with a spacing member located above said shoulder for the purpose of locating the upper end of said nipple at a point substantially below the upper end of said hole, the thickness of said spacing member being equal to the distance between the lower face of said valve body and the upper end of said nipple whereby upon the removal of said spacing member the upper end of said nipple can be located flush with the upper face of said valve body.

AUGUST C. BARNEBL.

REFERENCES CITED

The following references are of record in the file of this patent:

UNITED STATES PATENTS

| Number | Name | Date |
|---|---|---|
| 1,335,695 | Oliver | Mar. 30, 1920 |

FOREIGN PATENTS

| Number | Country | Date |
|---|---|---|
| 22,961 | Great Britain | of 1908 |